United States Patent [19]

Speller, Sr. et al.

[11] Patent Number: 4,864,702

[45] Date of Patent: Sep. 12, 1989

[54] FIVE AXIS RIVETER

[75] Inventors: Thomas H. Speller, Sr., Buffalo; John W. Davern, North Tonawanda; Jeffery P. Weaver, Tonawanda; Mark J. Andrews, Niagara Falls, all of N.Y.

[73] Assignee: Gemcor Engineering Corp., Buffalo, N.Y.

[21] Appl. No.: 129,929

[22] Filed: Dec. 2, 1987

Related U.S. Application Data

[63] Continuation-in-part of Ser. No. 745,253, Jun. 14, 1985, abandoned.

[51] Int. Cl.⁴ .............................................. B23B 11/00
[52] U.S. Cl. .................................. 29/34 B; 29/243.54; 29/243.53
[58] Field of Search ..................................... 227/51–62, 227/99, 110; 29/34 B, 243.53, 243.54, 526 P, 565, 788, 796; 409/33

[56] References Cited

U.S. PATENT DOCUMENTS

| | | | |
|---|---|---|---|
| 3,534,896 | 10/1970 | Speller et al. | 227/51 |
| 3,557,442 | 1/1971 | Speller | 29/526 |
| 4,575,289 | 3/1986 | Fischer et al. | 409/33 |

FOREIGN PATENT DOCUMENTS 0495183 of 1950 Belgium ................. 227/51

Primary Examiner—Timothy V. Eley
Attorney, Agent, or Firm—Christel, Bean & Linihan

[57] ABSTRACT

Riveting apparatus for operation on a workpiece having opposite sides and supported vertically on a horizontal surface comprising a frame having a pair of spaced apart sides movable along the supporting surface and straddling the workpiece, first and second carriages movably mounted on respective sides of the frame and riveting tools on first and second heads on the first and second carriages, respectively, the tools being movable toward and away from the workpiece. The frame travels in a first direction along the supporting surface and along the workpiece, the first and second carriages are movable in a direction substantially perpendicular to the first direction and toward and away from the supporting surface, and the frame is movable in a third direction transverse to the first direction and toward and away from the workpiece. The first and second heads are movable independently about axes substantially parallel to the first direction and to the supporting surface, and both heads are movable independently about axes substantially perpendicular to the first direction and to the supporting surface.

The workpiece is supported by a fixture extending along the path of travel of the apparatus and the fixture is supported at spaced locations therealong above the supporting surface by retractable supports separately movable away from the fixture to provide clearance space between the fixture and the supporting surface for travel of a base of the machine.

In a riveting system wherein a plurality of such workpieces are supported vertically on a horizontal surface and arranged in spaced apart parallel rows, there is provided a shuttle carriage extending transverse to the workpiece paths and intersecting the paths for receiving the riveting apparatus and transferring it to any of the other workpiece paths in a manner maintaining the same orientation of the apparatus about a vertical axis during the transfer.

7 Claims, 8 Drawing Sheets

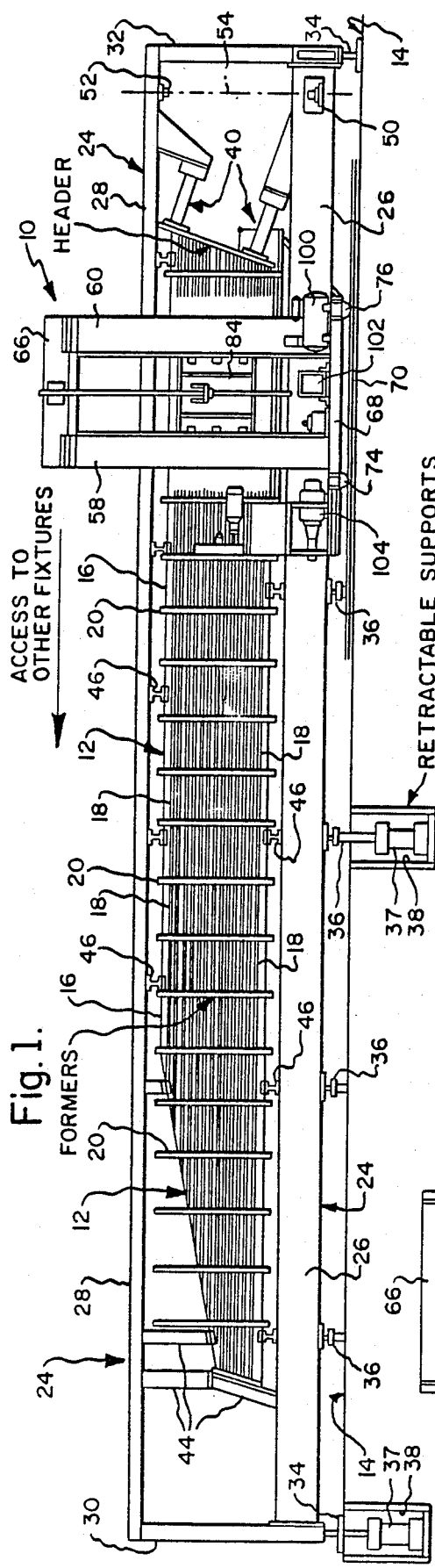

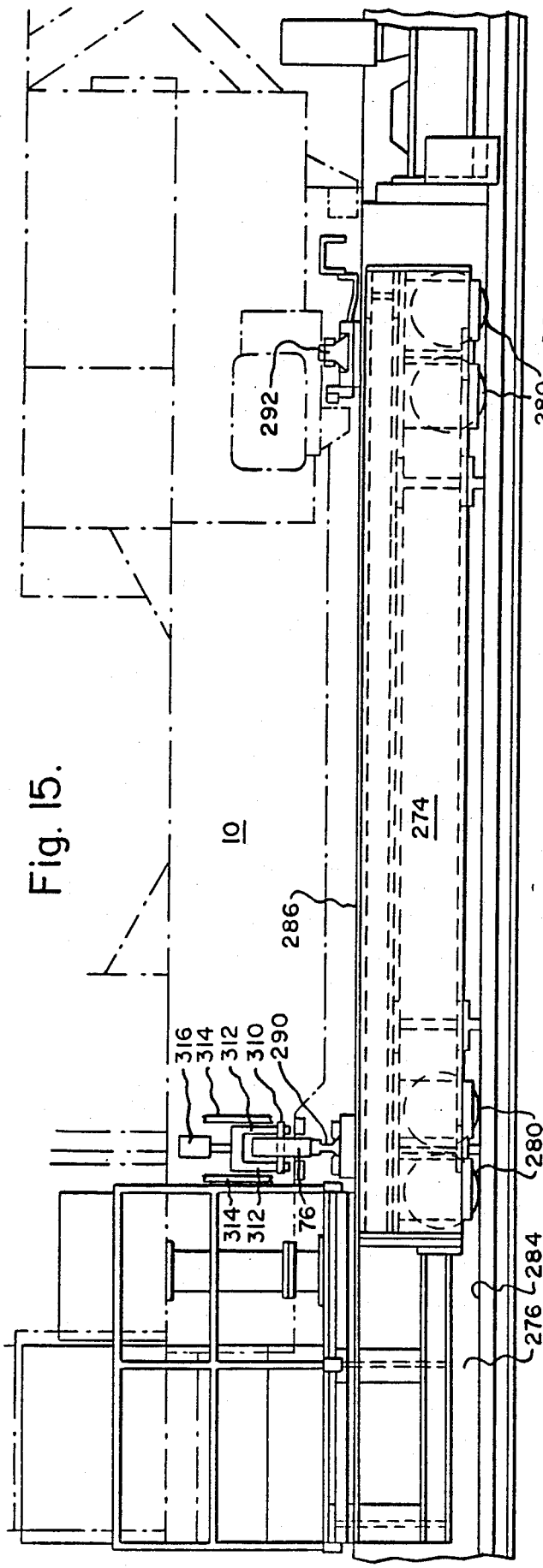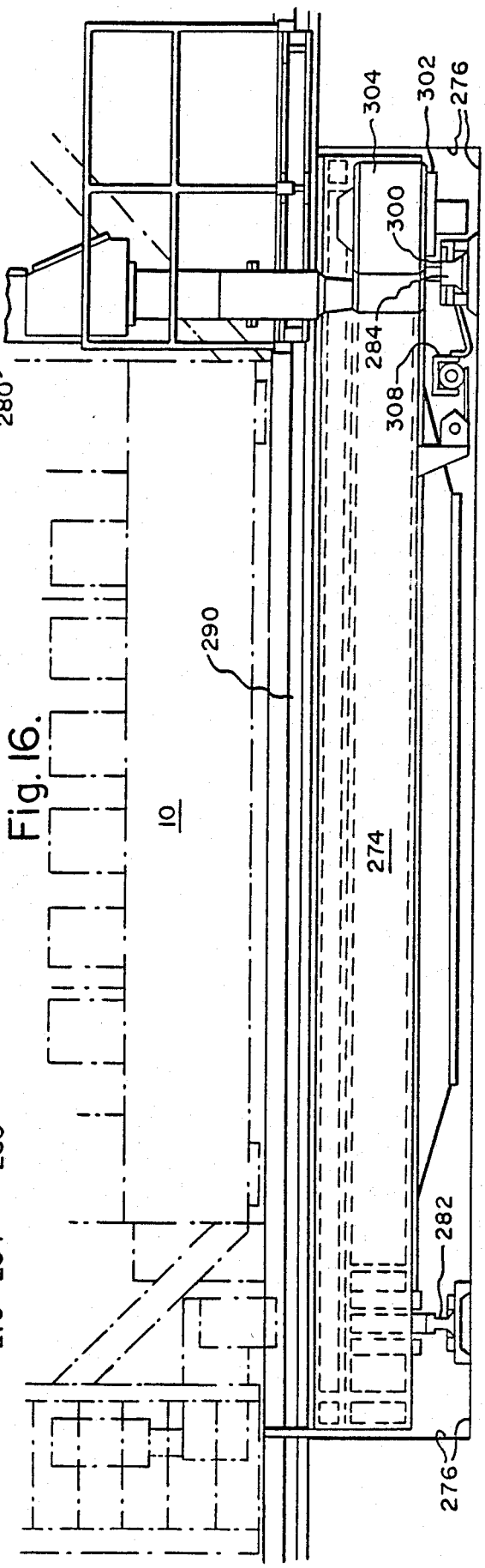

FIVE AXIS RIVETER

This application is a continuation-in-part, of application Ser. No. 745,253, filed June 14, 1985, now abandoned.

BACKGROUND OF THE INVENTION

This invention relates to the art of automatic drilling and riveting machines, and more particularly to a new and improved automatic drilling and riveting machine for operation on major subassemblies.

One area of use of the present invention is in automatic drilling and riveting of vertically disposed workpieces, although the principles of the present invention can be variously applied. An example of such a workpiece is a contoured wing panel rigidly held vertically in a fixture wherein a series of closely-spaced, horizontally disposed stringers are to be riveted to the wing panel. Because of the large size and weight of such major subassemblies, it is desirable to provide an automatic drilling and riveting machine which moves along a stationary workpiece while operating thereon. In the design of such a machine, an important consideration is providing controlled movement of the drilling and riveting tools in a significant number of directions. Another important consideration is providing an arrangement for supporting the vertically disposed workpiece in a manner which does not interfere with movement and operation of the drilling and riveting machine. In addition, it would be highly desirable to provide a simple yet effective arrangement for transferring the machine between a series of such vertically disposed workpieces for operation thereon.

SUMMARY OF THE INVENTION

It is, therefore, a primary object of this invention to provide a new and improved automatic drilling and riveting machine for operation on major subassemblies.

It is a more particular object of this invention to provide such an automatic drilling and riverting machine for movement along a stationary workpiece comprising a major subassembly while operating thereon.

It is a further object of this invention to provide such a machine having controlled movement of the drilling and riveting tools in a significant number of directions.

It is a further object of this invention to provide for use with such a machine an arrangement for supporting the workpiece in a vertical position and in a manner which does not interfere with movement and operation of the drilling and riveting machine.

It is a further object of this invention to provide a simple yet effective arrangement for transferring such a machine between a series of vertically disposed workpieces for operation thereon.

The present invention provides riveting apparatus for operation on a workpiece having opposite sides and supported on a surface with the sides disposed substantially perpendicular to the supporting surface, the riveting apparatus comprising a frame having a pair of spaced apart sides adapted to move along the supporting surface and extending along the workpiece in a manner such that the frame sides are in straddling relation to the workpiece, first and second carriage means movably mounted on respective sides of the frame and riveting tools on first and second head means in first and second positioning means on the first and second carriage means, respectively, the tools being movable toward and away from the workpiece.

The apparatus further comprises means on the frame co-operating with means on the supporting surface for moving the frame in a first direction along the supporting surface and along the workpiece, means on the first and second carriage means co-operating with means on respective sides of the frame for moving the first and second carriage means in a direction substantially perpendicular to the first direction and toward and away from the supporting surfaces, and means for moving the frame in a third direction transverse to the first direction and toward and away from the workpiece.

The apparatus further comprises means on the first and second head means co-operating with means on the first and second positioning means for moving the first and second head means independently about axes substantially parallel to the first direction and to the supporting surface, and means on the first and second positioning means co-operating with means on the first and second carriage means for moving the first and second head means independently about axes substantially perpendicular to the first direction and to the supporting surface.

In a riveting system wherein the workpiece is supported by a fixture extending along the path of movement of the apparatus, the fixture is supported at spaced locations therealong above the supporting surface by fixture supporting means separately movable away from the fixture to provide clearance space between the fixture and the supporting surface for travel of a base of the riveting apparatus.

In a riveting system wherein a plurality of such workpieces are supported substantially vertically on a horizontal supporting surface and arranged in spaced apart substantially parallel rows, there is provided shuttle means extending transverse to the workpiece paths and intersecting the paths for receiving the riveting apparatus and transferring it to any of the other workpiece paths in a manner maintaining the same orientation of the apparatus about a vertical axis during the transfer.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a side elevational view illustrating the riveting apparatus of the present invention operating on a workpiece in the form of a major subassembly held in a fixture;

FIG. 2 is a plan view of the riveting apparatus and fixture of FIG. 1;

FIG. 3 is an end elevational view of the riveting apparatus and fixture of FIG. 1;

FIG. 15 is an elevational view similar to FIG. 4 showing a portion of the riveting apparatus and illustrating in side elevation a transfer vehicle for use in the arrangement of FIG. 13; and FIG. 16 is a side elevational view thereof of the transfer vehicle of FIG. 15 as it would appear in carrying the riveting apparatus.

DETAILED DESCRIPTION OF THE ILLUSTRATED EMBODIMENTS

Figure 4:
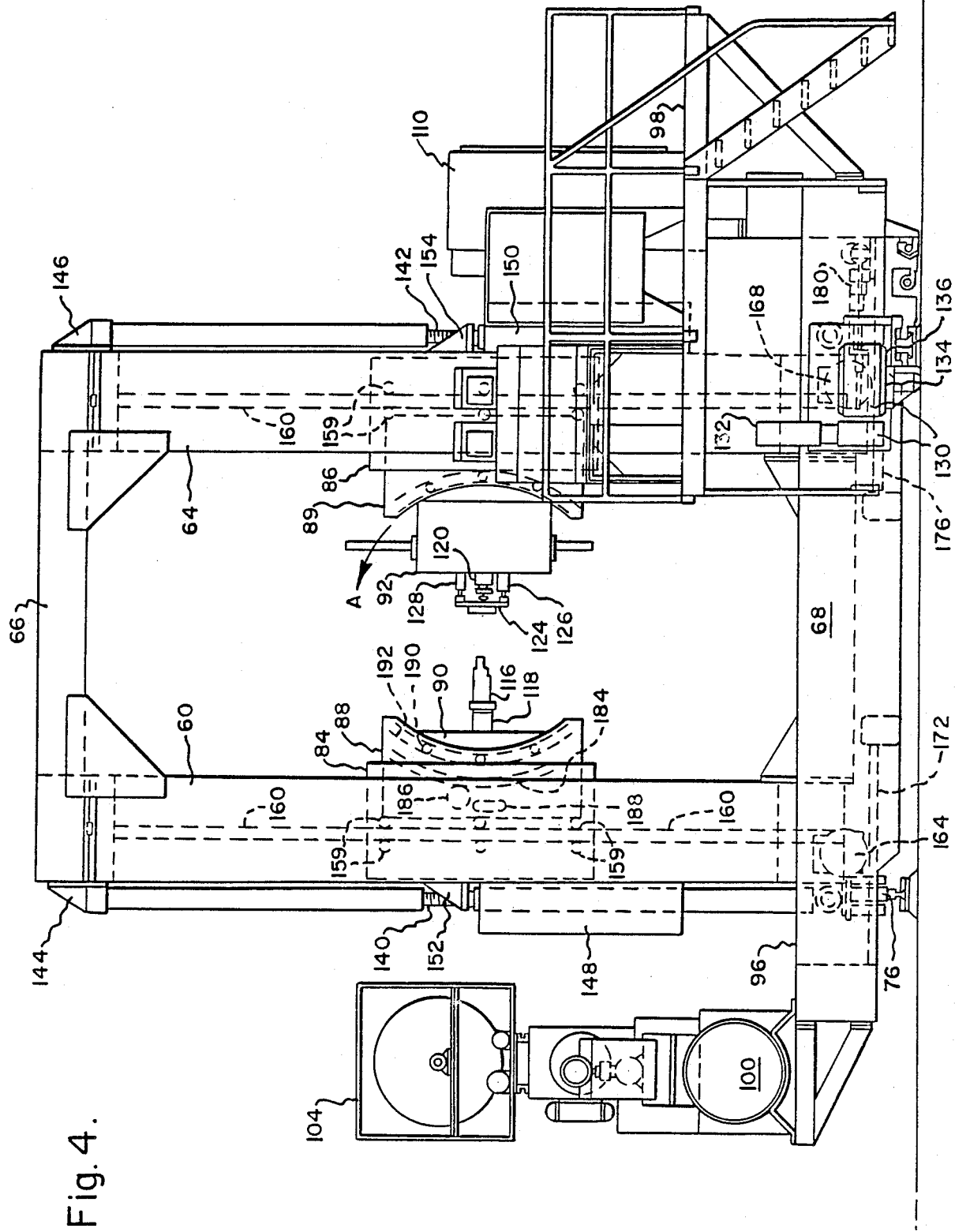
FIG. 4 is an end elevational view of the riveting apparatus of the present invention.

Referring now to FIGS. 1–3, there is shown riveting apparatus generally designated 10 for operation on a workpiece, generally designated 12, having opposite sides and supported on a surface generally designated 14 with the workpiece sides disposed substantially perpendicular to the supporting surface. Typically surface 14 is the floor of a building such as a factory. In the present illustration, workpiece 12 comprises a contoured wing panel rigidly held vertically in a fixture wherein a series of closely-spaced, horizontally disposed stringers are to be riveted to the wing panel. In particular, as shown in FIG. 1, the wing panel includes a wing skin designated 16 which typically comprises a series of sections initially joined together in a suitable manner to provide a workpiece of significant length. The stringers designated 18 are in closely-spaced horizontal relation and held in place prior to riveting the wing skin by a series of vertically spaced formers 20 in a manner which will be described. The arrangement of wing skin 16, stringers 18 and formers 20 is held in a fixtures generally designated 24 in a manner so as to be disposed vertically, i.e. such that the opposite sides of the workpiece are substantially perpendicular to supporting surface 14.

The fixture 24 comprises a lower frame member or beam 26 disposed substantially parallel to supporting surfaces 14, an upper frame or beam 28 in spaced, substantially parallel relation to frame 26, and a pair of end frame members 30 and 32. In the arrangement shown, the opposite ends of fixture 24 are supported on surface 14 by screw jack leveling positioners 34 to provide three leveling points on the fixture. In accordance with the present invention, fixture 24 also is supported intermediate the ends thereof at spaced locations by alignment support and correction mechanisms in the form of hydraulic screw jacks 36. Each of the retractable supports 36 can be lowered, i.e. moved away from fixture frame 26 toward surface 14, to provide clearance for travel of riveting machine 10 along the workpiece in a manner which will be described. A preferred form of supports includes an hydraulic cylinder 37 disposed vertically in pit 38 extending below surface 14. The workpiece is held in fixture 24 by the master tooled header assembly 40 near end 32, by the support members generally designated 44 near end 30, and by a series of V-block type clamps or holders 46 at spaced locations between the lower and upper frames 26 and 28, respectively, and the adjacent edges of the workpiece 12. Header 40 is made from a master tool so that it will fit its opposite header, i.e. to insure that lefthand and righthand counterparts of bulky parts such as wing parts fit together. A laser attitude control for horizontal/vertical alignment of fixture 24 and workpiece 12 comprises a laser light source 50 on frame 26 and a sensor 52 on frame 28, the light path therebetween indicated by the broken line 54.

Machine 10 comprises a frame having spaced-apart sides and adapted to move along workpiece 12 in a manner such that the sides of the frame straddle the workpiece 12. The machine sides are perpendicular to supporting surface 14 and parallel to the sides of workpiece 12. One of the sides of machine 10 is defined by a pair of upright, spaced and parallel columns, 58 and 60 shown in FIG. 1. As shown in FIGS. 2 and 3, the opposite side of the machine frame is defined by a pair of spaced apart upright and parallel columns 62,64. The machine frame includes a top 66 disposed parallel to supporting surface 14 for joining the frame sides, in particular, the columns 58,60,62 and 64 at the upper ends thereof as viewed in FIGS. 1–3. The machine frame also includes a base or bottom 68 disposed parallel to and located near supporting surface 14 and supporting the columns 58, 60, 62 and 64 at the lower ends thereof.

The riveting machine frame is adapted to move along track means on supporting surface 14 and extending along workpiece 12. In the arrangement shown, there is a pair of spaced apart, parallel track rails 70,72 each extending along a corresponding side of the arrangement of workpiece 12 and fixture 24. Movement of machine 10 is guided along rails 70,72 by means of wheels, for example, two of which wheels designated 74,76 in FIG. 1, which are rotatably connected in a suitable manner to base 68 and engage the rails 70, 72. One wheel can be sprung hydraulically so that all four wheels carry an equal load even though the tracks may be slightly misaligned in elevation, i.e. in the verical direction as viewed in FIGS. 1 and 3. A third rail 80 shown in FIG. 3 extends outwardly of, close to and parallel to one of the rails, for example rail 72 and serves as a drive rail and power bus. Machine 10 can be driven along rails 70,72 by means of a driven pinion on machine 10 engaging a rack on a rail in a manner which will be described in more detail presently. Alternatively, the wheels may be driven.

The riveting machine 10 of the present invention further comprises first and second carriage means 84 and 86, respectively, movably mounted on respective sides of the machine frame. Carrages 84,86 are movable toward and away from supporting surface 14 in directions parallel to the sides of the machine frame in a manner which will be described. This direction is substantially perpendicular to the above-described direction of movement of machine 10 along the tracks. The carriages 84 and 86, in turn, support and carry first and second positioners 88 and 89, respectively, which in turn support and carry first and second block means or head means 90 and 92, respectively. The heads 90,92 in turn, carry drilling and riveting tools for operation on workpiece 12 and are movable relative to the respective carriages 84,86 and positioners 88,89 in a manner which will be described.

The machine 10 also is provided with platforms 96 and 98 which extend out from the opposite sides for carrying other components of the machine. For example, in the machine shown, platform 96 carries an air compressor 100, refrigerator-dryer 102 for treatment of the air and an hydraulic pump and fluid cooler 104. Platform 98 carries a hopper 106 for storing rivets and cabinet 108,110 for housing various controls.

Figure 5:
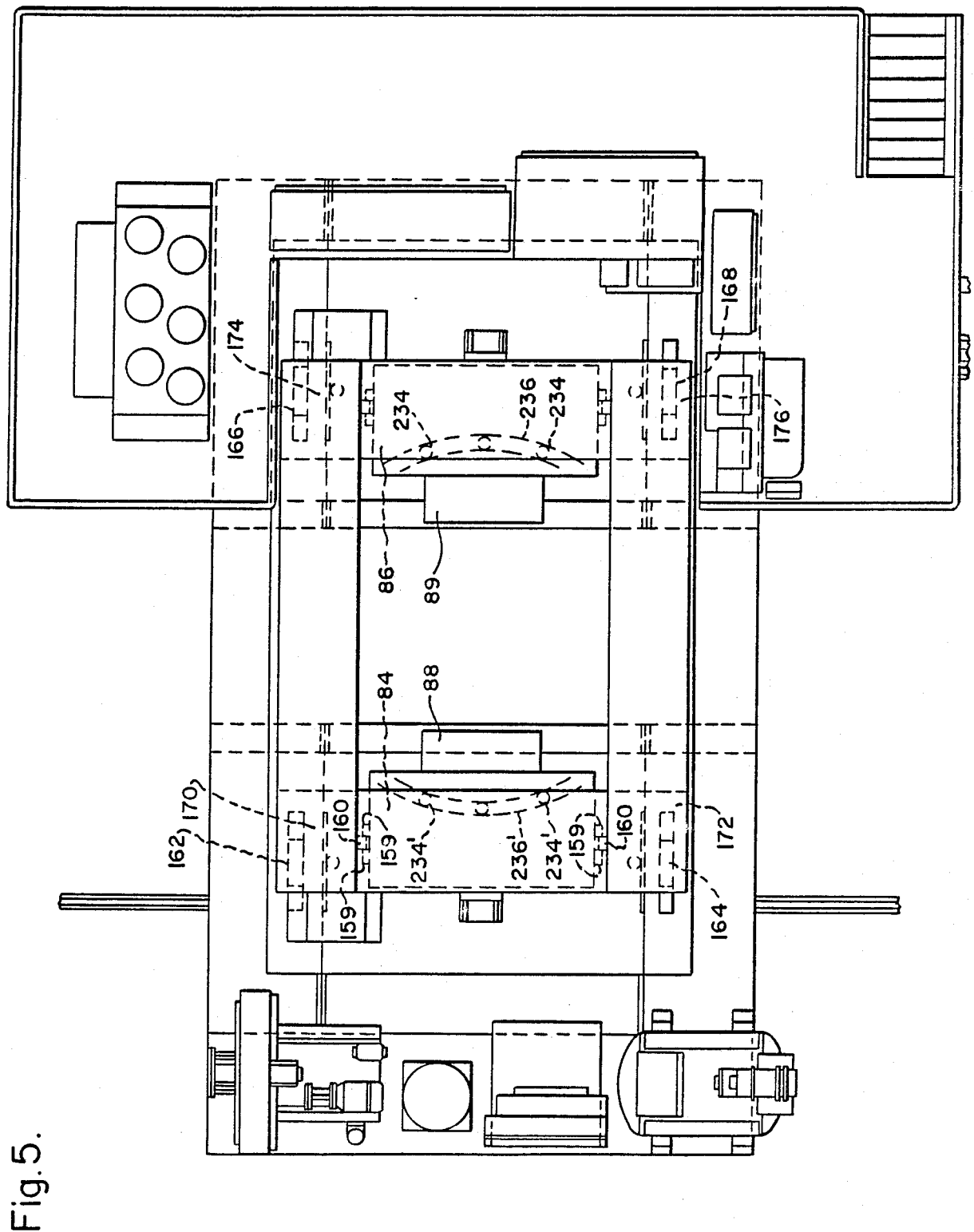
FIG. 5 is a top plan view of the apparatus of FIG. 4.
Figure 6:
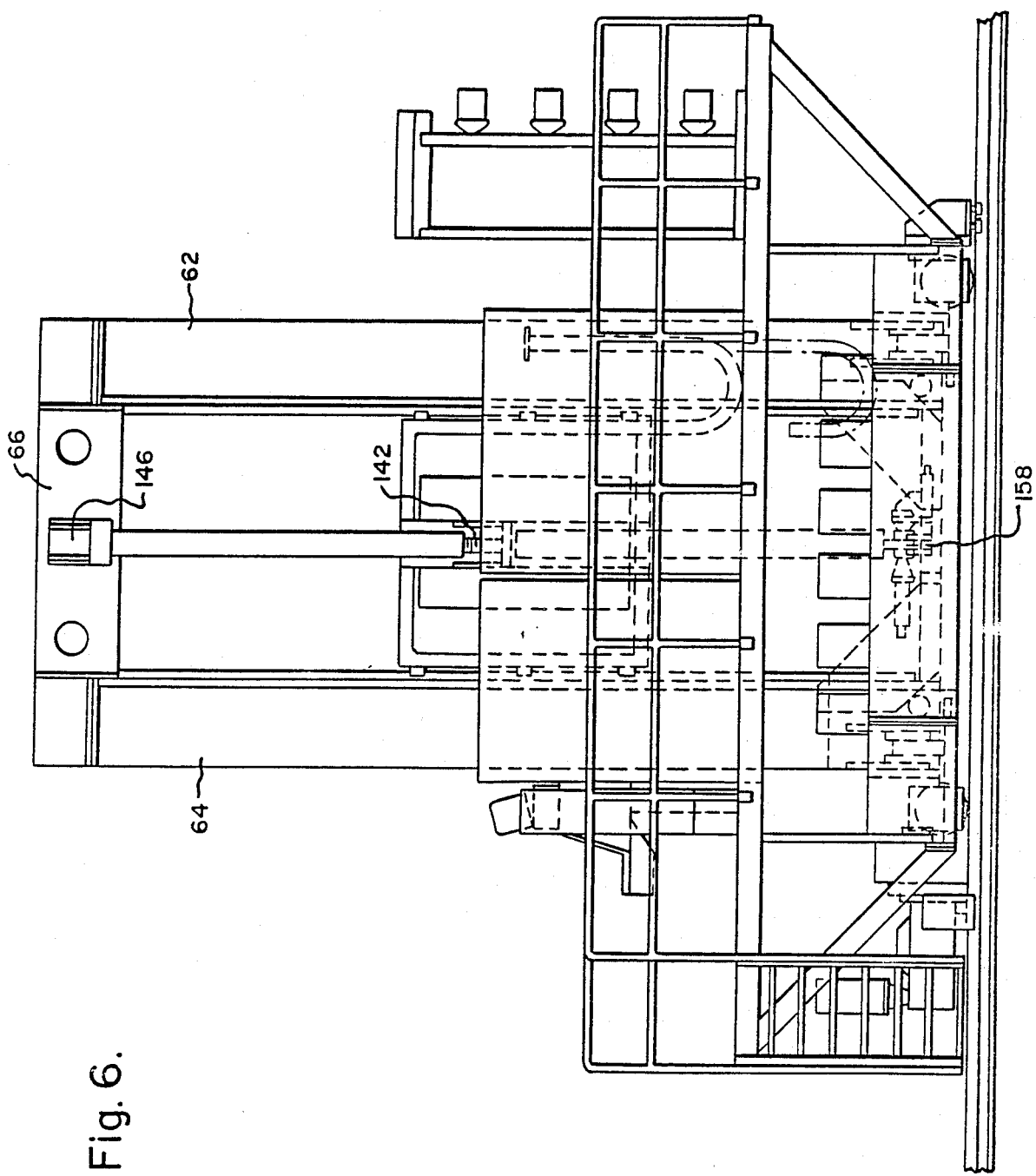
FIG. 6 is a side elevational view of the apparatus of FIG. 4.

FIGS. 4–6 are enlarged views of the riveting machine 10 of FIGS. 1–3. The heads or blocks 90,92 carry riveting tools and related instrumentalities. A rivet bucking tool 116 is mounted on a fixed axis with respect to upset head 90 and is adapted to be reciprocated by an hydraulic cylinder 118. This axis is the central operating axis, i.e. the drilling and riveting axis of machine 10. Movement of bucking tool 116 is toward and away from the workpiece, i.e. along a path extending in a direction through the sides of the workpiece. The drill/buck/shave or head 92 carries, drilling, riveting and shaving tool assemblies. For example the tools can be carried on a transfer plate (not shown) adapted to be moved in a direction normal to the above-identified operational axis to selectively place the tools in alignment with that axis. In the illustration of FIG. 4, the tool shown is a shaving tool 120 for smoothing the rivet heads after upset. For a more detailed description of an arrangement of linearly spaced drilling and riveting tools on a reciprocating transfer plate, reference may be made to U.S. Pat. No. 3,534,896 issued Oct. 20, 1970 entitled "Riveting Machine" and assigned to the assignee of the present invention, the disclosure of which is hereby incorporated by reference.

The tools carried by the transfer plate are moved by suitable means, such as by hydraulic cylinders, toward and away from the workpiece along paths which extend in a direction through the sides of the workpiece. A pressure foot bushing 124 also is carried by block 92 by means of spaced apart pneumatic cylinders 126,128. The bushing 124 is adapted to contact the workpiece around the location to be drilled and riveted, and the drilling and riveting tools move through a central opening in the bushing for contacting the workpiece. For a more detailed description of a pressure foot bushing and operation in drilling and riveting apparatus, reference may be made to U.S. Pat. No. 3,557,442 issued Jan. 26, 1971 entitled "Slug Riveting Method And Apparatus" and assigned to the assignee of the present invention, the disclosure of which is hereby incorporated by reference.

Movement of riveting machine 10 along tracks or rails 70,72 and 80 and hence along workpiece 12 in fixture 24 is provided in the present illustration by a rack and pinion drive. A gear box 130 carried by base 68 of the machine frame is driven by a servo motor 132. A pinion 134 on the output of gear box 130 meshes with a rack 136 on one of the rails, for example rail 72. For a more detailed description of a rack and pinion drive for a large riveting machine along a track, reference may be made to the aforementioned U.S. Pat. No. 3,534,896. The movement of machine 10 along the rails and along workpiece 12 is in a direction also designated the X axis. The exact location of machine 10 along the X axis is known at all times as derived from encoder feedback to the machine control. Alternatively, the wheels can be driven directly with periodic verification of position.

Carriages 84, 86 are movable in opposite directions along paths perpendicular to the supporting surface 14. These paths are perpendicular to the X axis and are identified also as the Y axis. There is provided means on the carriage means 84,86 cooperating with means on the respective sides of the machine frame for moving carriages 84,86 in the foregoing manner. In particular, a pair of ball screws 140 and 142 are provided, one on each side of the machine frame and rotatably connected at opposite ends, for example, in brackets 144 and 146, respectively, fixed to frame top 66 and suitable means (not shown) adjacent frame bottom 68. Nut members 148 and 150 are threaded on screws 144 and 146, respectively, and engage extensions 152 and 154, respectively, on carriages 84 and 86, respectively. Each ball screw and nut assembly is driven by a right angle gear box powered by single servo motor, for example the drive indicated 158 in FIG. 6. The ball screw and nut assembly are matched and preloaded, and the carriages 84,86 are synchronously indexed along the Y axis, with encoder feedback to the machine control for monitoring the location. The arrangement also includes suitable means for counterbalancingthe weight. Movement of carriages 84,86 is guided by engagement between rollers 159 on carriages 84,86 which ride along tracks 160 on the frame columns.

Machine 10 further comprises means for moving the frame in a transverse direction with respect to the workpiece to move the frame sides toward and away from the workpiece. The frame sides are movable in unison in this direction, which also is transverse to the direction of the rails 70,72 and which is designated the Z axis. The combination of columns 58, 60, 62 and 64 fixed to and depending from top 66 comprises a tied column structure. This structure is movably supported on the frame base or bottom 68 in the following manner. Columns 58, 60, 62 and 64 are provided with wheels 162, 164, 166 and 168, respectively, rotatably connected to the lower ends of the corresponding columns and contacting supporting surfaces on platforms in the form of slides 170, 172, 174 and 176, respectively, in frame base 68. The wheel axles are oriented to allow the above-identified transverse movement of the tied column structure. The structure is moved or indexed by a ball screw and nut assembly driven by a servo generally designated 180 in FIG. 4 wherein the ball screw is rotatably connected in frame base 68 and the nut member engages a surface of the tied column struhcture in a manner similar to that of the Y axis carriage drive. In the apparatus shown, the nut member of Z axis drive 180 operatively engages the lower end of column 64. Similar Z axis drive arrangements can be provided adjacent to the lower ends of the other three columns.

Machine 10 further comprises means on the first and second head means 90 and 92, respectively, co-operating with means on the first and second positioners 88 and 89, respectively, for moving the first and second head means 90,92 independently about axes substantially parallel to supporting surface 14 and the X axis. This direction is also designated the a axis and is normal to the plane of the paper as viewed in FIG. 4. Thus, each of heads 90,92 is pivotal about an axis, i.e. the a axis, generally parallel to the X axis. Movement of heads 90,92 is provided by rack and pinion drive arrangements in the heads and corresponding positioners. For example, as shown in FIG. 4, an arcuate rack 184 on head 90 is in meshing engagement with a pinion 186 rotatably mounted on positioner 88 and driven by a motorized gearbox 188 on positioner 88. Movement of head 90,92 about the a axis in positioners 88,89 is guided by co-operative engagement between bearings 190 and arcuate tracks 192 on both of the respective components. Only the arrangement on head 90 is shown in FIG. 4 for convenience. The gearboxes for both head preferably are driven by servo motors which drive the gear segments within established travel limitations determined by appropriate sensors, and the a axis travel of each head 90,92 can be matched through axis calibration at the machine control.

Figure 7:
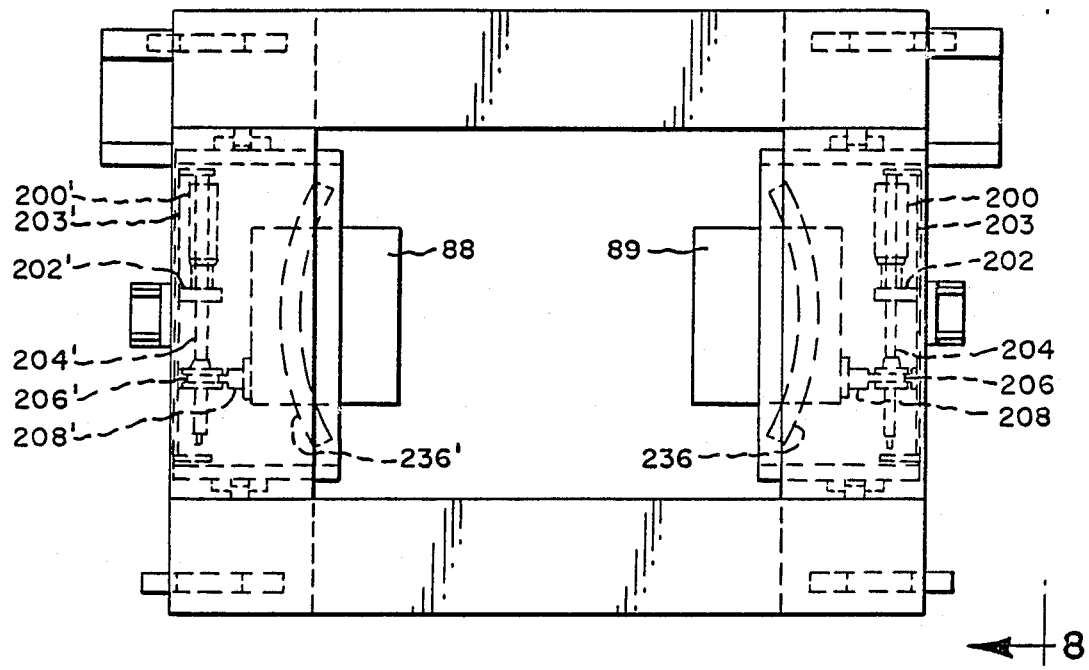
FIG. 7 is a view similar to FIG. 5 with parts removed and illustrating mechanisms for moving the positioning about axes perpendicular to the supporting surface.
Figure 8:
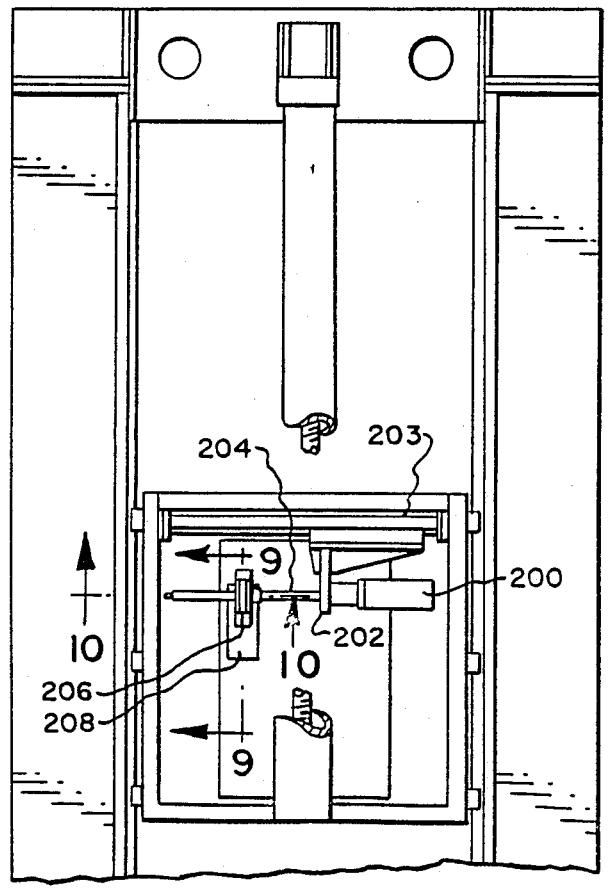
FIG. 8 is a side elevational view taken about on line 8—8 in FIG. 11.

Machine 10 further comprises means on the first and second positioners 88 and 89, respectively, co-operating with means on the first and second carriage means 84 and 86, respectively, for moving the first and second positioners and with them the first and second head means independently about axes substantially perpendicular to supporting surface 14 and substantially parallel to the Y axis. This direction is also designated the b axis and is normal to the plane of the paper as viewed in FIG. 5. Thus, each of the positioners 88 and 89 and corresponding one of the heads 90,92 is pivotal about an axis, i.e. the b axis, generally parallel to the Y axis. The positioners 88 and 89, and therefore the heads 90 and 92, are supported by trunnions mounted within the carriage 84 and 86, respectively, and each positioner 88,89 is driven within the b axis travel limits by a d.c. servo motor and ballscrew and nut assembly. In particular, as shown in FIGS. 7 and 8, a servo motor 200 is held by a trunnion bracket 202 connected to a b axis support beam 203 fixed to carriage 86. A ball screw assembly 204 driven by motor 200 is operatively associated with a trunnion assembly 206 connected by a bracket 208 to positioner 89. An identical arrangement of servo motor 200', trunnion bracket 202', b axis support beam 203 ballscrew assembly 204', trunnion assembly 206', and bracket 208' is provided for positioner 88 and carriage 84. For convenience, only the arrangement for positioner 89 and carriage 86 will be described in further detail, it being understood that the arrangement for positioner 88 and carriage 84 is identical in structure and operation.

Figure 9:
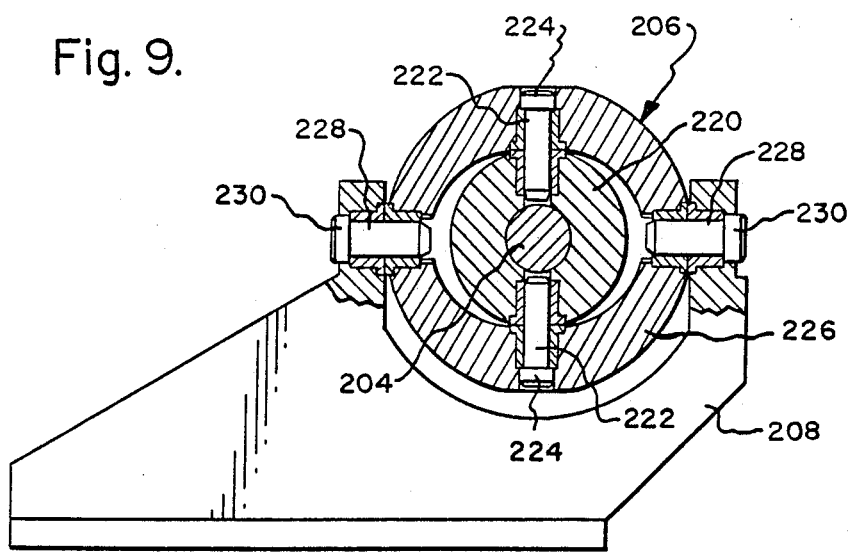
FIG. 9 is a sectional view taken about on line 9—9 in FIG. 8.
Figure 10:
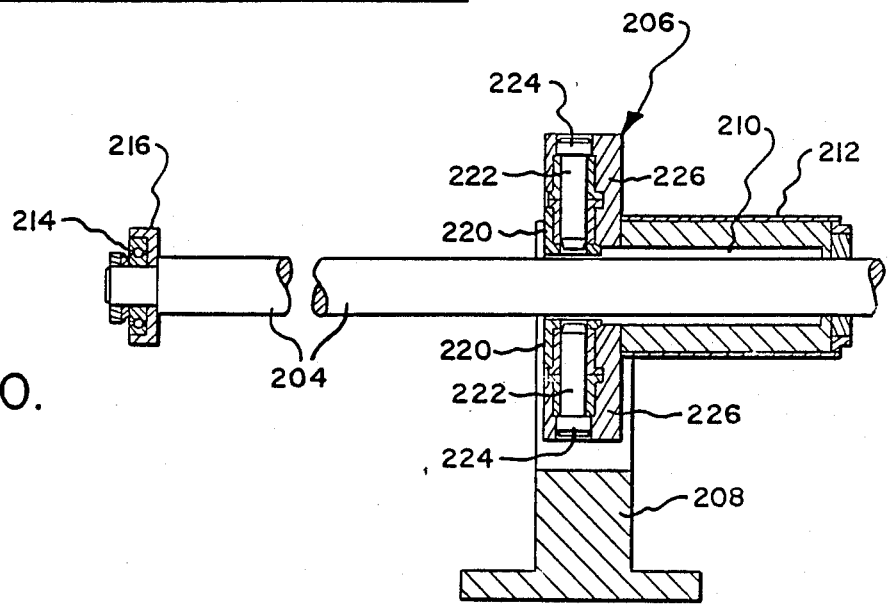
FIG. 10 is a sectional view taken about on line 10—10 in FIG. 8.

FIGS. 9 and 10 are enlarged views showing in further detail the operative relationship between ball screw assembly 204 and trunnion assembly 206. A nut member 210 on screw 204 has one end within trunnion assembly 206 and is housed within a ball nut guard 212. The end of screw 204 opposite motor 200 is supported within an arrangement of radial bearing 214 and bearing housing 216 which can be supported on carriage 86. Trunnion assembly 206 includes a trunnion plate 220 to which the end of nut 210 is fixed and through which screw 204 rotatably extends and a pair of diametrically opposed trunnion pins 222 and pin bushings 224 for mounting t5trunnion plate 220 within a trunnion ring 226. Another pair of diametrically opposed trunnion pins 228 and pin bushings 230, spaced ninety degrees from the other pins and bushings, connect trunnion ring 226 to bracket 208. Rotation of screw 204 in either direction moves nut 210 to the left or right in FIG. 10 to pivot trunnion 206 and bracket to pivot positioner 89 and with it head 92 about the b axis.

Movement of heads 90,92 about the b axis in carriages 84,86 is guided by co-operative engagement between bearings 234 and arcuate tracks 236 on the respective components. Movement of head 90,92 about the b axis can be under closed loop sensor control and the travel of each positioners 88,89 and with them head can be matched through axis calibration at the machine control.

Figure 11:
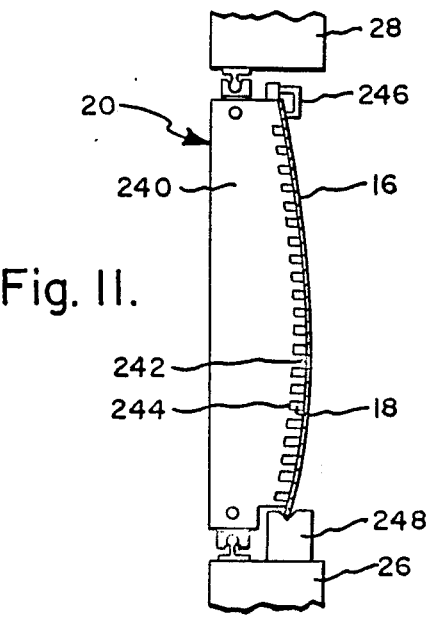
FIG. 11 is a fragmentary elevational view of an arrangement including a former board for holding the stringers in place against the wing skin during a riveting operation of the type shown in FIG. 1.

FIG. 11 illustrates in further detail one of the formers 20 in the arrangement of FIG. 1. It comprises an elongated board 240 having one side 242 curved to on conform to the surface of the workpiece, i.e. wing skins 16, and provided with a series of spaced notches or recesses 244 to receive stringers 18. The opposite side of board 240 can be straight. A clamp 246 secures skin 16 to board 240 at the upper end of the arrangement of FIG. 11 and a V-block member 248 further supports wing skin 16 at the lower end.

Figure 12:
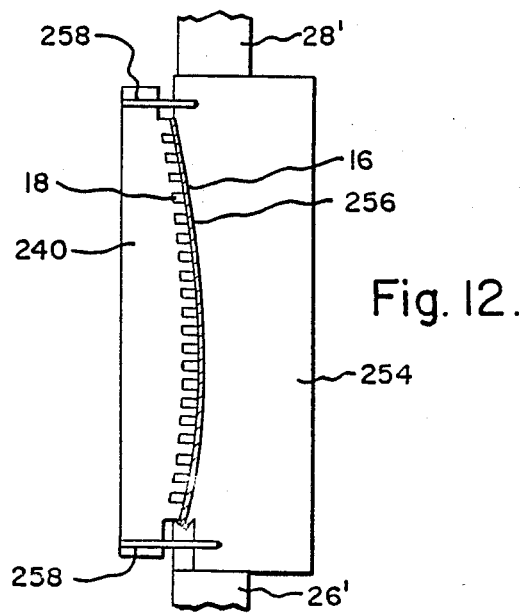
FIG. 12 is a fragmentary elevational view of an arrangement including a former board and strongback for holding the stringers and wing skin in the fixture during riveting.

FIG. 12 illustrates an alternative arrangement for use in some riveting applications wherein the combination of former board 240, wing skin 16 and stringers 18 is fastened to a strongback 254 which, in turn, is tightly held between upper and lower frames 28' and 26', respectively of a fixture. Strongback 254 is in the form of an elongated board having a curved side 256 confirming to the curvature of skin 16 and having a straight opposite side. Former board 240 is connected to strongback 254 by suitable fasteners 258. The overall width of the arrangement of FIG. 12 is greater than that of FIG. 11 and is considered in providing the movement capability of machine 10 in the Z axis direction.

Riveting machine 10 of the present invention operaes in the following manner. The machine 10 travels along workpiece 12 and fixture 24 in the X axis direction as shown in FIG. 1 to move successively to various locations on workpiece 12 to be drilled and riveted. During movement of machine 10 in this direction, the individual retractable supporting cylinders 36 move downward, one-by-one, to surface 14 or below if a recess is provided to allow riveter 10 to move to the next location. As the machine 10 passes, the particilar cylinder 36 rises to support the workpiece once again. In conjunction with movement of machine 10 along the X axis, carriages 84,86 are movable along he Y axis to reach additional locations to be drilled and riveted. In addition, movement of heads 90 and 92 about the a and b axes accommodate the surface contour of the workpiece 12. At each location of fastening, machine 10 goes through the typical sequence of drilling the workpiece, rivet insertion and upset, and rivet head shaving. Pressure foot bushing 124 and bucking ram 116 contact opposite sides of the workpiece 12 and each of the tools is movale into alignment with the drilling and riveting axis, toward and away from the workpiece and out of alignment with the axis. The foregoing operations are well known to those skilled in the art, and for a more detailed description thereof, reference may be made to the above-referenced patents 3,534,896 and 3,557,442.

By way of example, where workpiece 12 comprises the vertical wing skin 16 and horizontal stringers 18 shown in FIG. 1, the axis motions of machine 10 are as follows: X is travel along the wing span, Y is travel along the chord length, Z is travel to compensate for chord height, a is rotation about the X axis and b is rotation about the Y axis. The X, Y, Z, a and b motions allow machine 10 to align the riveting process normal to any point on the workpiece within an established work envelope. The X and Y axes can be programmable and addressable axes. The Z, a and b motions can be controlled by a closed loop normality sensor servo system which traces the aerodynamic surface of the workpiece.

For tool-to-tool alignment, along the drilling and riveting axis, heads 90,92 can be mechanically geared together vertically through matched ball screws, matched right angle gear boxes and a single drive motor-gear-reducer-hydraulic counterbalance arrangement. A axis angle control can be through a simultaneous signal feed to two servo drives, each having an axis calibration supplied by the machine control so that slight deviation from the true position can be corrected. B axis angle control likewise can be through a second set of servo drives, again provided with axis calibration. The a and b axis originate at the work outer surface. The origins are held to that point by a Z axis movement sensor and associated servo motor and feedback loop. This is so that a minor deviation in the a or b attitude will have no effect on the X or Y position.

Machine 10 can move along workpiece 12 in fixture 24 several ways to accommodate the presence of formers 20. For example, machine 10 can move in the X direction for riveting up to a former, then in the Z direction around the former and then in the X direction for continued riveting up to the next former and so as along the workpiece 12. The machine 10 can return to allow riveting in its location as machine 10 proceeds in the return direction. After machine 10 rivets and proceeds away from the location of a removed former it is replaced. The removal and replacement of formers 20 can be done manually or automatically by machine, either under control of riveter 10 or in response to a central control. Alternatively, machine 10 can move in a forward X direction for riveting up to a former, move in the reverse X direction a small distance to allow removal of the former either manually or by machine, then proceed in the forward X direction to rivet in the location of the former and beyond whereupon the former is returned to its position.

Figure 13:
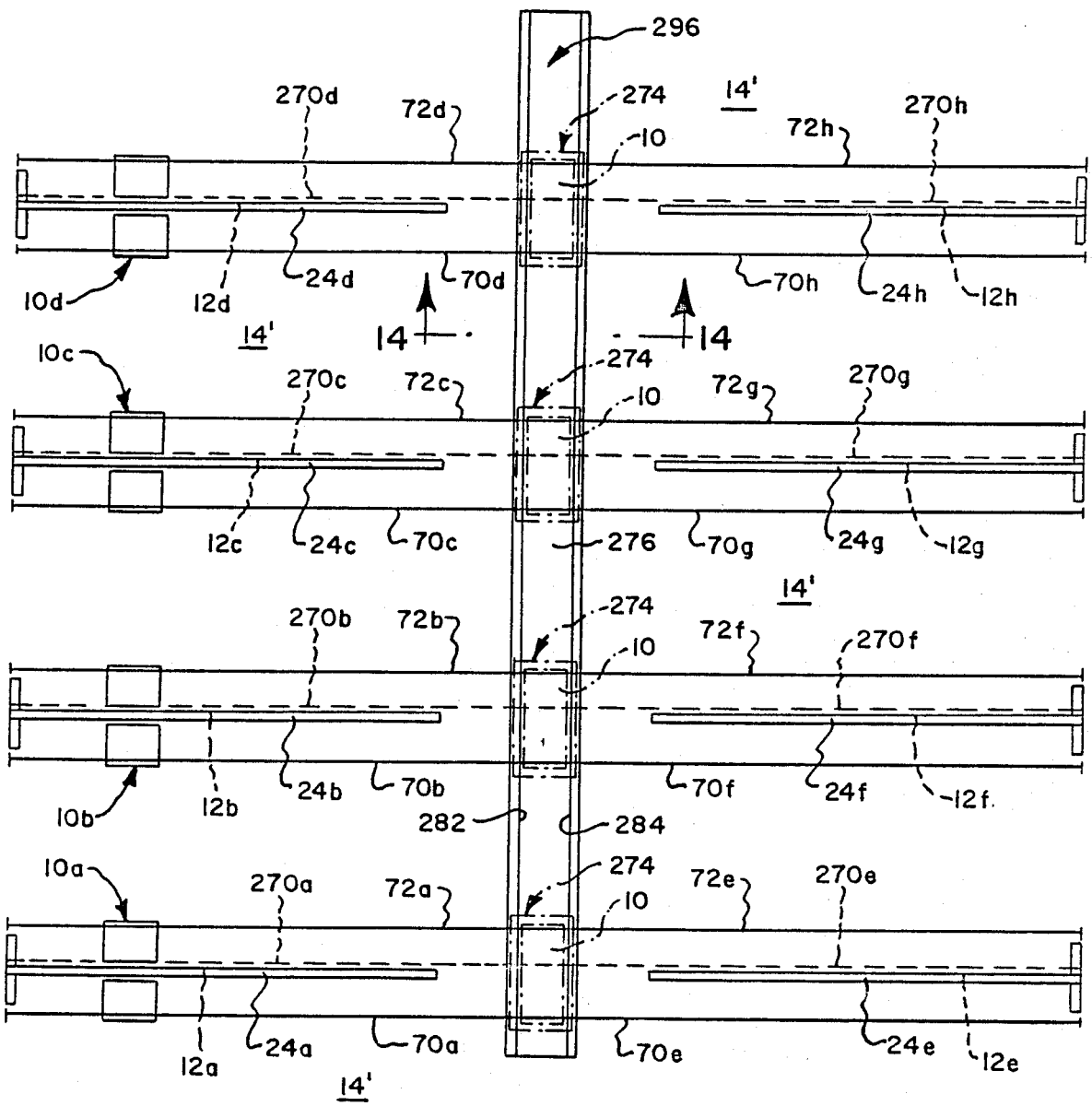
FIG. 13 is a plan diagrammatic view illustrating an arrangement for transferring the riveting apparatus of the present invention between rows of vertically disposed workpieces for operation thereon.
Figure 14:
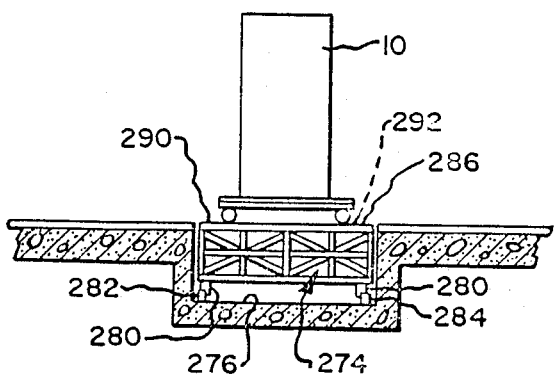
FIG. 14 is an elevational view, partly in section, taken about on lines 14–14 in FIG. 13.

FIGS. 13 and 14 are diagrammatic views of a riveting system according to the present invention including a plurality of riveters identical to riveter 10 and a plurality of workpieces and fixtures similar to workpiece 12 and fixture 24. In the system shown, there are eight workpieces 12a-12h supported in eight fixtures 24a-24h. The workpiece and supporting fixtures are arranged in four spaced-apart, mutually parallel rows comprising a first set, and another, four spaced-apart, mutually parallel rows in longitudinal alignment with the first four rows and comprising a second set. The workpiece and corresponding fixtures are disposed perpendicular to, i.e. vertically, a supporting surface 14'. In the system shown there are four riveters 10a, 10b, 10c and 10d each of the type like riveter 10 of FIGS. 1–10 including a frame having a pair of spaced apart sides adapted to move along track means on the supporting surface extending along a workpiece in a manner such that the frame sides are in straddling relation to the workpiece and carry drilling and riveting tools that are movable toward and away from the workpiece. In the present illustration of riveting stringers to wing skins, the eight workpieces 12a-12h can comprise the left wing rear lower skin, left wing rear upper skin, left wing front lower skin, left wing front upper skin, right wing rear lower skin, right wing rear upper skin, right wing front lower skin, and right wing front upper skin, respectively. The travel path for each riveter along each workpiece and fixture is defined by spaced-apart, parallel tracks 70a, 72a-70h, 72h. In addition, the tracks of aligned rows are also aligned i.e. tracks 70a,72a are in longitudinal alignment with tracks 70e,72e and so on through the entire arrangement. Along each row there is an X axis drive power bars and track 270a-270h, and tracks of aligned or opposite rows are aligned, for example tracks 270a and 270e.

In the illustrative arrangement shown riveters 10a-10d are located on the paths containing workpieces 12a-12d, respectively. The system of the present invention enables any riveter to be moved to any workpiece and fixture area in the arrangement of FIGS. 13 and 14 or to an out of service location for maintenance. To this end there is provided shuttle carriage means adapted to receive and carry any riveter and movable along means defining a shuttle path extending in a direction transverse to and in communication with, i.e. intersecting, the workpiece paths. As the riveter is received and carried by the shuttle carriage its orientation about the Y axis is not changed, and when the destination is reached the riveter simply can move off the carriage without changing position and is immediately ready for travel along the row where it is left by the shuttle carriage.

As shown in FIG. 14, the shuttle carriage means comprises a carriage 274 of welded steel construction which travels within a shallow pit 276 extending tranverse to track 70a,72a-72h, to any of the four interface locations shown in FIG. 13. For convenience, these four interface location are indicated by the representation of shuttle carriage 274 and riveter 10 shown in broken lines. Carriage 274 is supported by wheel track assemblies 280 of sufficient size to support the weight of the riveter and be electrically driven. To this end, rails 282,284 extend along the bottom of pit 276. The top 286 of shuttle carriage 274 is substantially flush with supporting surface 14 and is provided with track assemnblies 290,292 and a power trolley matching those utilized to facilitate riveter X axis travel. The tracks 290,292 are aligned with the tracks 70,72 at each intersection point allowing the riveter X axis drive to power directly onto the shuttle carriage 274. The carriage 274 has its own controller and operator. As shown in FIG. 13, pit 276 extends beyond the rows containing workpiece 12d, 12h to an out of service shunt location 296 for maintenance or storage. If desired, shunt side tracks at location 296 can be provided, extending perpendicular to pit 276, for temporary removal of a riveter from th shuttle carraige.

Thus, one riveter can be taken out of service by moving it to the shunt section 296, and by replacement of a fixture in place with a workpiece, the appropriate riveter can be brought out of the shunt section and moved on line using the shuttle carriage 274 to move the riveter to the assembly area where used. Although the shuttle or traverse carriage 274 is used primarily to move riveters to and from assembly areas and to and from out of service or maintenance areas, when empty the shuttle carriage 274 can serve as a bridge over the shuttle or traverse pit 276.

FIGS. 15 and 16 are enlarged views showing in further detail the shuttle or traverse carriage 274 and pit 276. As shown in FIG. 15, on the top surface 286 of carriage 274 is provided with a pair of spaced apart rails 290,292 onto which a riveter 10 is moved and supported for conveyance by carriage 274 along the transverse path defined by pit 276. As shown in FIG. 16, shuttle carriage is driven by a rack and pinion arrangement including a rack 300 on one of the tracks in pit 276, for example track 284, which is engaged by a pinion 302 driven by a motorized gear box 304 on carriage 274.

Electric power is supplied by a rail 308. Alternatively, the shuttle carriage wheels can be driven directly.

As previously mentioned, one of the four wheels providing movement of fastening machine 10 in the X direction is sprung by flexible supporting means, preferably fluid operated, so that the wheel carries its share of the load independent of vertical position over a short travel. For accurate placement of fasteners, it is of utmost importance that the two tracks along which machine 10 travels be parallel in both plan and elevation. As shown in FIG. 15, one of the wheels, for example wheel 76, is hydraulically sprung so that all four wheels of machine 10 carry an equal load even though the tracks 70,72 may be slightly misaligned in elevation. Such vertical misalignment can occur over the large extent of surface 14 travelling along the length of the workpiece 12. As shown in FIG. 15, the wheel bearing assembly and axle 310 are carried by block means 312 having a pair of arm-like side members joined by a web to provide a fork-like structure which rides up and down between gibs 314 which are fixed to be stationary with respect to the machine frame. The flexible supporting means is in the form of an hydraulic cylinder 316 the housing of which is fixed to the machine frame and the piston rod of which is connected to block means 312. Cylinder 316 is provided with controlled pressure to provide a maximum stroke in the vertical direction of about one-quarter inch.

It is a therefore apparent that the present invention accomplishes its intended objects. While embodiments of the present invention have been described in detail, that is for the purpose of illustration, not limitation.

We claim:

1. Riveting apparatus for operation on a workpiece having opposite sides and supported on a surface with said sides disposed substantially perpendicular to said supporting surface, said riveting apparatus comprising:
   (a) a frame having a pair of spaced apart sides adapted to move along said supporting surface and extending along said workpiece in a manner such that said frame sides are in straddling relation to said workpiece;
   (b) first and second carriage means movably mounted on respective sides of said frame;
   (c) first and second positioning means carried by said first and second carriage means, respectively;
   (d) riveting tools on first and second head means on said first and second positioning means, respectively, said tools being movable toward and away from said workpiece;
   (e) means on said frame co-operating with means on said supporting surface for moving said frame in a first direction along said supporting surface and along said workpiece;
   (f) means on said first and second carriage means co-operating with means on respective sides of said frame for moving said first and second carriage means in a direction substantially perpendicular to said first direction and toward and away from said supporting surface;
   (g) means for moving said frame in a third direction transverse to said first direction and toward and away from said workpiece;
   (h) means on said first and second head means co-operating with means on said first and second positioning means for moving said first and second head means independently about axes substantially parallel to said first direction and to said supporting surface; and
   (i) means on said first and second positioning means co-operating with means on said first and second carriage means for moving said first and second positioning means and with them said first and second head means independently about axes substantially perpendicular to said first direction and to said supporting surface.

2. Apparatus according to claim 1, wherein said means on said supporting surface comprises track means and said means for moving said frame in said first direction comprises drive means co-operating between said track means and said frame.

3. Apparatus according to claim 1, wherein said means for moving said first and second carriage means comprises a driven ball screw and nut assembly for each of said carriage means.

4. Apparatus according to claim 1, wherein said frame comprises at least one column on each of said sides and said columns are joined at the top thereof to provide a tied column structure, and wherein said frame further comprises a base and said columns are supported at the lower ends thereof on said base in a manner allowing movement of said tied column structure in said third direction.

5. Apparatus according to claim 4, wherein said means for moving said frame in said third direction comprises drive means carried by said base and operatively connected to at least one of said columns.

6. Apparatus according to claim 1, wherein said means for moving said first and second head means about axes substantially parallel to said first direction comprises co-operating arcuate rack and pinion drive means on each of said first and second head means and said first and second positioning means.

7. Apparatus according to claim 1, wherein said means for moving said first and second positioning means about axes substantially perpendicular to said first direction comprises a trunnion assembly connected to each of said positioning means and a ball screw and nut assembly operatively associated with said trunnion assembly and driven by motor means carried by the corresponding one of said carriages.

* * * * *